United States Patent [19]

Kasatani et al.

[11] Patent Number: 5,024,605
[45] Date of Patent: Jun. 18, 1991

[54] CONNECTING ELECTRODE

[75] Inventors: Yasushi Kasatani; Toru Tachikawa, both of Itami, Japan

[73] Assignee: Mitsubishi Denki Kabushiki Kaisha, Japan

[21] Appl. No.: 552,139

[22] Filed: Jul. 13, 1990

[30] Foreign Application Priority Data

Aug. 18, 1989 [JP] Japan .................. 1-213569

[51] Int. Cl.$^5$ .............................................. H01R 3/00
[52] U.S. Cl. ..................................... 439/500; 439/862; 429/99
[58] Field of Search ................. 439/433, 434, 95, 101, 439/108, 500, 860, 883, 830, 833, 851–857, 816, 862; 429/96, 99, 100, 121, 163; 320/2–15

[56] References Cited

U.S. PATENT DOCUMENTS

| | | | |
|---|---|---|---|
| 2,731,586 | 1/1956 | Born ................................... | 439/500 |
| 3,629,793 | 12/1971 | Ettischer et al. .................... | 439/500 |
| 3,856,577 | 12/1974 | Oki et al. ............................ | 429/96 |
| 4,237,409 | 12/1980 | Sugalski ............................. | 320/2 |
| 4,515,872 | 5/1985 | Okano ................................. | 429/99 |
| 4,558,270 | 12/1985 | Liautaud et al. .................... | 439/929 |
| 4,718,742 | 1/1988 | Utoh et al. .......................... | 429/100 |

FOREIGN PATENT DOCUMENTS

| 0085211 | 8/1983 | European Pat. Off. ............ | 429/100 |
|---|---|---|---|
| 0096274 | 8/1981 | Japan ................................. | 429/100 |

Primary Examiner—David L. Pirlot
Attorney, Agent, or Firm—Leydig, Voit & Mayer

[57] ABSTRACT

A connecting electrode includes an electrode substrate, a contact having a buttonhook-shaped section provided on the electrode substrate, a convex surface of the contact projecting from the electrode substrate for deformation by a battery and a projection from the substrate beside the convex surface for controlling the amount of deformation of the contact by a battery.

3 Claims, 2 Drawing Sheets

CONNECTING ELECTRODE

FIELD OF THE INVENTION

The present invention relates to a connecting electrode for electrically connecting an internal battery of such as a semiconductor device card.

BACKGROUND OF THE INVENTION

FIGS. 3(A)–3(C) are views showing a conventional connecting electrode used in a semiconductor device card, in which FIG. 3(A) is a plan view and FIGS. 3(B) and 3(C) are sectional views taken along lines III(B)—III(B) and III(C)—III(C) of FIG. 3(A), respectively. In FIGS. 3(A)–3(C) reference numeral (1) designates a planar electrode substrate and reference numeral (2) designates a contact provided on the electrode substrate (1) and formed of a spring material, which has a convex surface (3) bent like a buttonhook and projecting from the electode substrate (1). The electrode substrate (1) and the contact (2) comprise the connecting electrode.

FIGS. 4(A)–4(C) are views in which the connecting electrode shown in FIG. 3 is mounted on a semiconductor device card with a battery in place. FIG. 4(A) is a plan view thereof and FIGS. 4(B) and 4(C) are sectional views taken along lines IV(B)—IV(B) and IV(C)—IV(C) in FIG. 4(A), respectively. Reference numeral (4) designates a frame of the semiconductor device card on which the electrode substrate (1) is mounted. Reference numeral (5) designates a battery pressed toward the right in FIG. 4(C), that is, toward the convex surface (3) of the contact (2) by means not shown.

Next, operation thereof will be described hereinafter. When one electrode of the battery (5) (not shown) is pressed against the contact (2) bent like a buttonhook as shown in FIGS. 3(B) and 3(C), the contact (2) receiving the force extends its bending part (6) and finally deforms into a straight line, that is, it is completely compressed as shown in FIGS. 4(B) and 4(C). Electrical connection between the battery (5) and the contact (2) is maintained by the elastic force by which the contact (2) tries to return to the original shape of a buttonhook. The other electrode of the battery (5) (not shown) is appropriately connected and then electric power is supplied to an electric circuit (not shown) of the semiconductor device card.

Since the conventional connecting electrode is constructed as described above, the force generated when the battery is in place completely compresses the contact. At this time, excessive stress is generated thereon and contact pressure between the battery and the contact generated by the elasticity of the contact is reduced due to fatigue or creep caused by vibration. As a result, the battery is not in contact with the contact when it receives external vibrations and then power supply is not applied to the electric circuit, causing stored information to be erased.

SUMMARY OF THE INVENTION

The present invention was made to solve this problem and it is an object of the present invention to provide a connecting electrode in which contact pressure between a contact and a battery is maintained for a long time.

These objects and other objects, features, aspects and advantages of the present invention will become more apparent from the following detailed description of the present invention when taken in conjunction with the accompanying drawings.

A connecting electrode in accordance with the present invention comprises a projection on a surface of an electrode substrate on the same side as and beside a convex surface of a contact so that the amount of deformation of the contact is controlled when the contact is pressed against by a battery.

According to the connecting electrode of the present invention, a battery abuts the projection on the electrode substrate after it presses against the contact and the contact deforms to some degree. Thus, force from the battery is received by the projection. As a result, the contact does not deform excessively that it is prevented from being completely compressed.

DETAILED DESCRIPTION OF THE PREFERRED EMBODIMENTS

An embodiment of the present invention will be described in detail with reference to the drawings.

Figure 1:
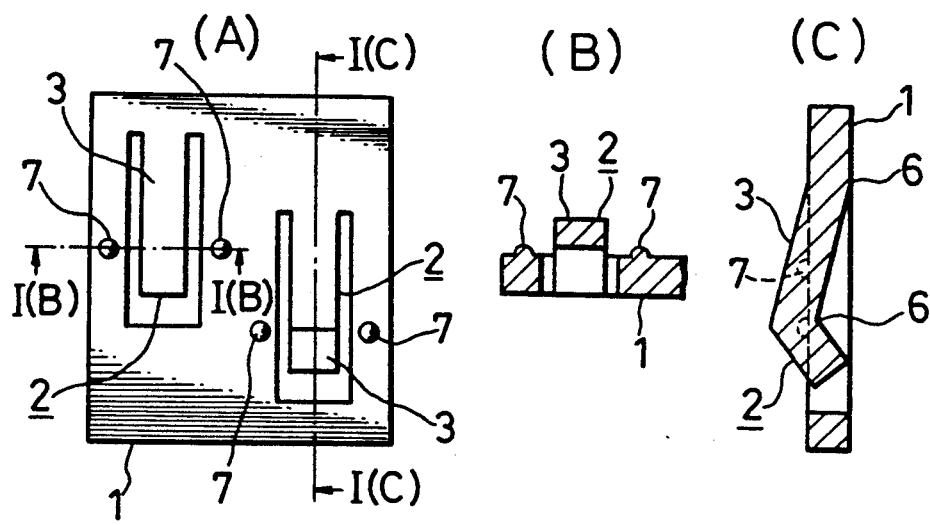
FIG. 1(A) is a plan view showing a connecting electrode in accordance with an embodiment of the present invention.
FIGS. 1(B) and 1(C) are sectional views taken along lines I(B)—I(B) and I(C)—I(C) in FIG. 1(A), respectively.
Figure 3:
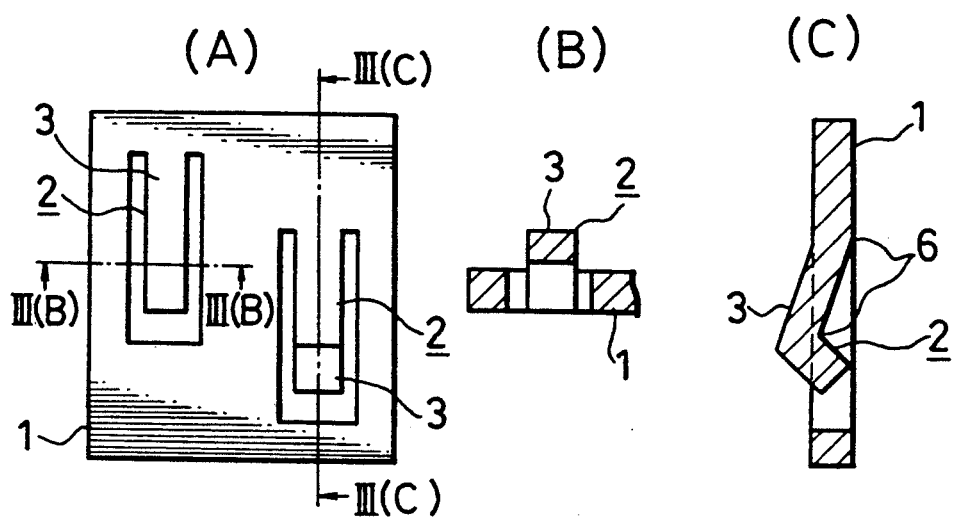
FIG. 3(A) is a plan view showing a conventional connecting electrode.
FIGS. 3(B) and 3(C) are sectional views taken along lines III(B)—III(B) and III(C)—III(C) in FIG. 3(A), respectively.
Figure 4:
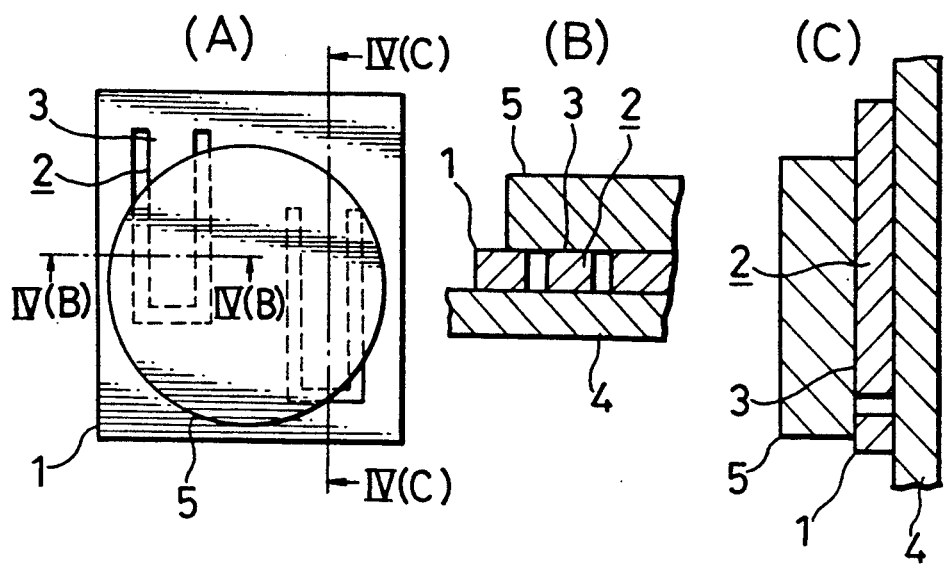
FIG. 4(A) is a plan view in which the connecting electrode shown in FIG. 3 is mounted on a semiconductor card and a battery is in place.
FIGS. 4(B) and 4(C) are sectional views taken along lines IV(B)—IV(B) and IV(C)—IV(C) in FIG. 4(A), respectively.

FIGS. 1(A)–1(C) are views showing a connecting electrode in accordance with an embodiment of the present invention, in which FIG. 1 (A) is a plan view and FIGS. 1(B) and 1(C) are sectional views taken along lines I(B)—I(B) and I(C)—I(C) in FIG. 1(A), respectively. In FIG. 1, since reference numerals (1) to (3), and (6) designate the same parts as in a conventional example in FIGS. 3(A)–3(C) description thereof is omitted. Reference numeral (7) designates a projection provided on an electrode substrate (1) on the same side as and beside the convex surface (3) of the contact (2). In addition, projections (7) are provided on both sides of the contact (2) and on the same side of the substrate (1).

Figure 2:
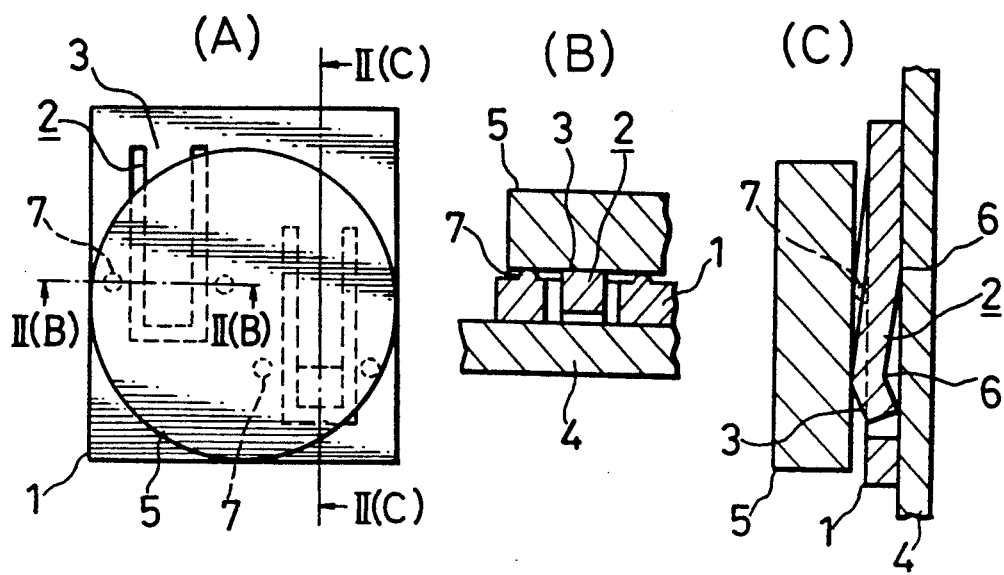
FIG. 2(A) is a plan view in which the connecting electrode shown in FIG. 1 is mounted on a semiconductor device card and a battery is in place.
FIGS. 2(B) and 2(C) are sectional views taken along lines II(B)—II(B) and II(C)—II(C) in FIG. 2(A), respectively.

FIGS. 2(A)–2(C) are views in which the connecting electrode shown in FIG. 1 is mounted on a semiconductor device card and a battery is in place. FIG. 2(A) is a plan view and FIGS. 2(B) and 2(C) are sectional views taken along lines II(B)—II(B) and II(C)—II(C) in FIG. 2(A), respectively. Operation will be described with reference to these figures hereinafter. The electrode substrate (1) is mounted on the frame (4) on a semiconductor device. The battery (5) abuts the contact (2) and is pressed toward the right in the figure. Then, a bending part (6) of the contact (2) is bent by that force and the contact (2) deforms. However, since the battery (5) abuts the projection (7) after the contact (2) deforms to some degree, the force from the battery (5) is received by this projection (7). Therefore, the contact (2) does not deform excessively. More specifically, since an amount of deformation of the contact (2) is controlled by the projection, it does not deform in a straight line, that is, it is not completely compressed. As a result, stress of the contact (2) is reduced and a reduction in the elastic force of the contact (2) due to fatigue or creep is prevented.

Although there are two contacts (2) and a projection (7) is provided at each side of each contact (2) in the above embodiment, the number of these projections may be increased or decreased depending on the size of the battery or the structure of the electrode substrate.

As described above, according to the present invention, the projection is provided on the electrode substrate on the same side as the convex surface of the contact. Therefore, the force from the battery is received by this projection and the amount of deformation of the contact is controlled, so that its stress is reduced. As a result, contact pressure between the contact and the battery is maintained for a long time without any reduction of its elastic force.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A connecting electrode comprising:
   an electrode substrate;
   a contact extending from said substrate having a buttonhook-shaped section and a convex surface, said convex surface of said contact projecting from said electrode substrate for depression by a battery; and
   a projection limiting the amount of deformation of said contact by a battery, said projection projecting from the same side of the substrate as and beside said convex surface for engaging a battery urged against said battery contact.

2. A connecting electrode comprising a unitary metal electrode having first and second sides, said battery contact being a buttonhook-shaped deformable battery contact having first and second ends, formed from and joined to said substrate at said first end and including a convex surface proximate said second end projecting beyond said first surface for contacting a battery urged against said convex surface and at least one projection projecting from said first side proximate said convex surface limiting the deformation of said battery contact by a battery urged against said contact and said first side by engaging a battery urged against said battery contact.

3. The connecting electrode of claim 2 including two projections projecting from said first side with said convex surface therebetween, both projections limiting the deformation of said battery contact by a battery urged against said contact and said first side by engaging a battery urged against said battery contact.

* * * * *